Figures 1, 2:
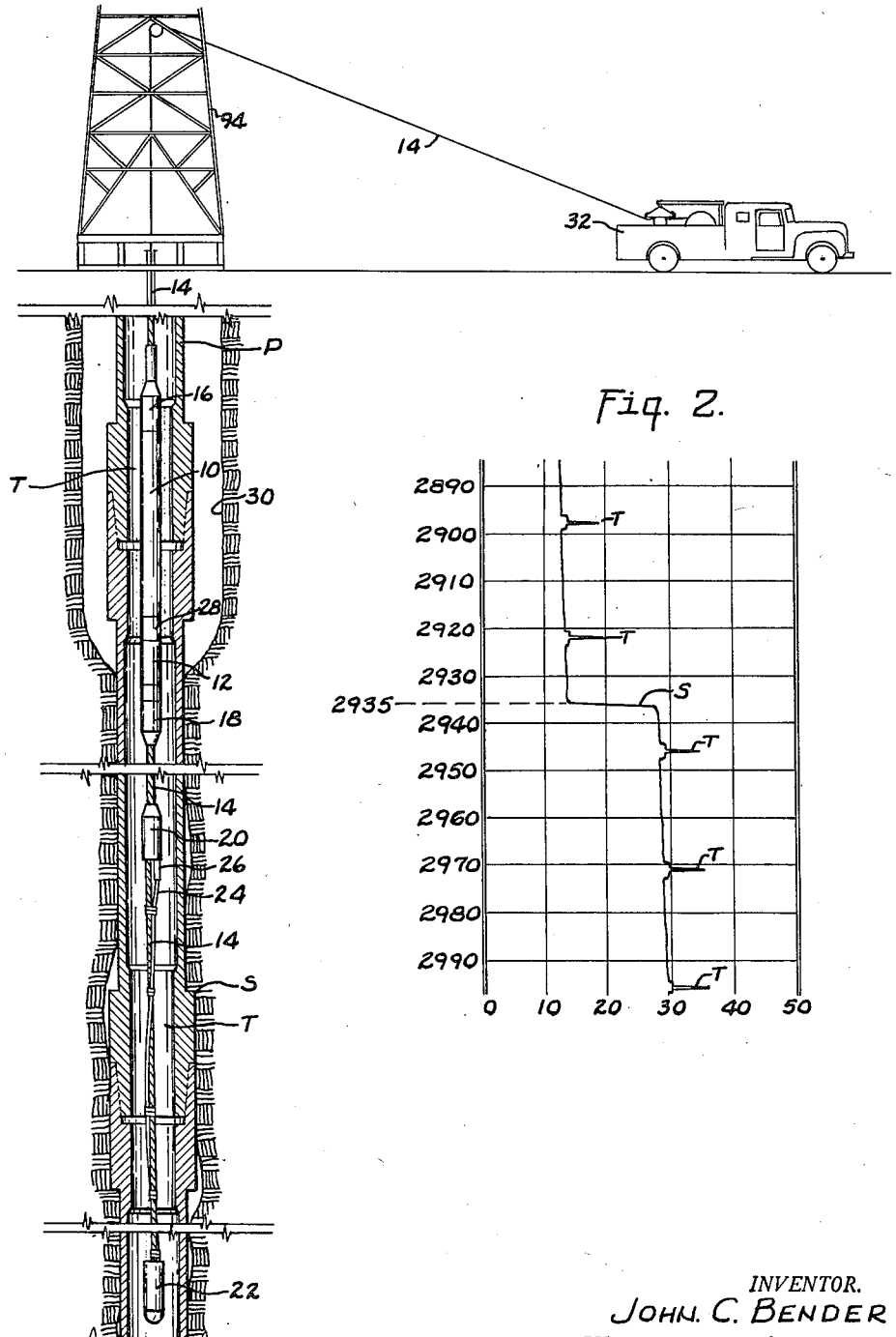

Aug. 10, 1954

J. C. BENDER 2,686,039

METHOD OF AND APPARATUS FOR DETERMINING
PHYSICAL PROPERTIES OF MATERIALS

Filed July 3, 1950

4 Sheets-Sheet 1

INVENTOR.
JOHN. C. BENDER
BY James H. Weiler

Aug. 10, 1954   J. C. BENDER   2,686,039
METHOD OF AND APPARATUS FOR DETERMINING
PHYSICAL PROPERTIES OF MATERIALS
Filed July 3, 1950   4 Sheets-Sheet 2

INVENTOR.
JOHN C. BENDER
BY James H. Weiler

INVENTOR.
JOHN C. BENDER
BY James H. Weiler

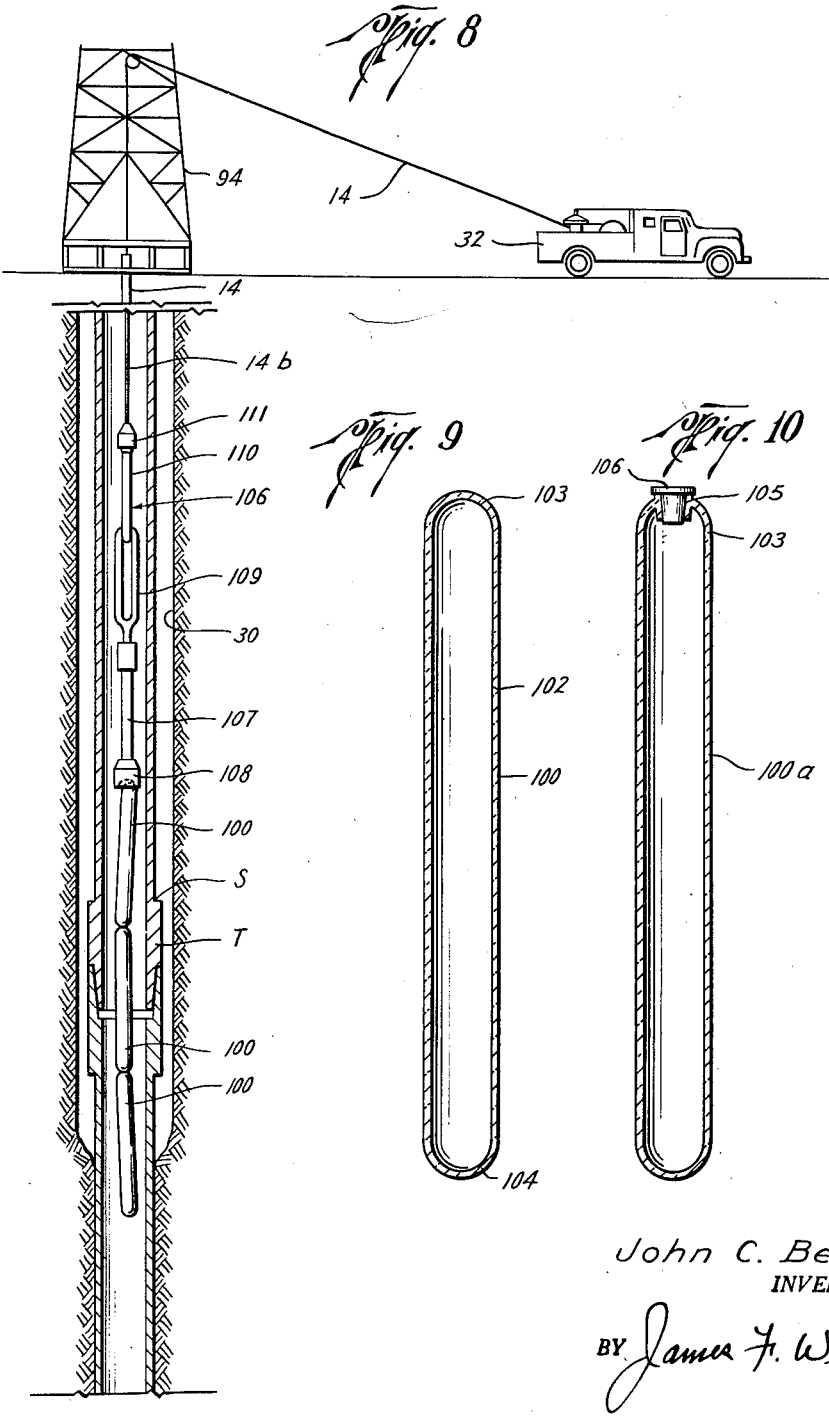

Patented Aug. 10, 1954

2,686,039

UNITED STATES PATENT OFFICE 2,686,039

METHOD OF AND APPARATUS FOR DETERMINING PHYSICAL PROPERTIES OF MATERIALS

John Carlos Bender, Houston, Tex., assignor to Houston Oil Field Material Company, Inc., Houston, Tex., a corporation of Delaware Application July 3, 1950, Serial No. 171,919

20 Claims. (Cl. 255—1.8)

This invention relates to a method of and apparatus for determining physical properties of materials and determining physical properties of pipe in a well bore whereby varying physical conditions thereof may be indicated in a testing circuit thereby determining with accuracy such conditions and the location of forces effecting such conditions.

In the drilling of oil wells it frequently becomes desirable for a number of reasons to locate accurately certain conditions of the pipe and certain conditions in the well bore affecting such pipe positioned therein. For example, where drilling is by the rotary method frequently the drill string or pipe becomes stuck or fixed in the well bore. Several and various causes contribute to this condition, such as caving, sedimentation, heaving and consequent packing of sand or earth formations about the pipe. It is, of course, highly desirable to determine as accurately as possible the exact point at which the pipe or casing is lodged or fixed in the well bore in order that the pipe may be retrieved in a most efficient manner and that a maximum amount of free pipe may be recovered on the first pipe retrieving run.

It is a prime object to provide a means for and method of inductively coupling successive portions of the pipe to a testing circuit thereby making such portions part of the testing circuit whereby changes in the reflected load of the pipe will be indicated therein thereby indicating conditions of the pipe.

It is an important and major object of my invention to provide a means for and method of disconnecting and recovering stuck pipe in a well bore wherein complete control over all operations is maintained at all times. For example, it is desirable to determine whether the torque applied to the pipe which completes disconnection of the pipe on impact extends down to the stuck portion; this is an important factor in crooked holes. It is also of prime importance to determine whether the pipe has been freed upon impacting, and it is extremely desirable to determine these and other factors and conditions all in one trip in the well bore.

The present invention is an adaptation of the theory that the reflected load of an element inductively coupled to a testing circuit will vary with changes in the physical condition of the element, such as changes in resistivity, size and permeability, thereby providing an indication of such change in the reflected load in such circuit; and, accordingly, providing an indication as to the condition of or external conditions affecting the element.

It is a still further feature of my invention to provide a strain gage which may be easily secured to such structures, on derricks, bridges and other stressed members.

It is yet a further feature to provide a strain gage which is capable of accurately indicating minute strain or load in the member to which it is attached.

A still further feature of my invention is the provision of a strain gage which may be secured to a specimen and readings made at a remote point, the coil being a portion of a radiating medium.

Still further features and objects will be apparent from the following description of various embodiments of my invention.

The present method and apparatus is particularly, but not necessarily, adapted for determining the location of stuck pipe in a well bore and recovering the same and, accordingly, the following description of one embodiment thereof is directed toward that adaptation.

Figure 3:
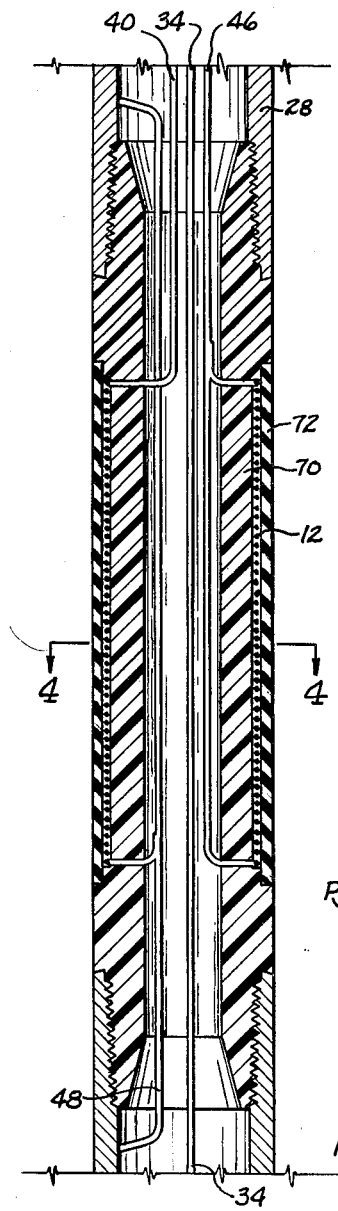
Figure 4:
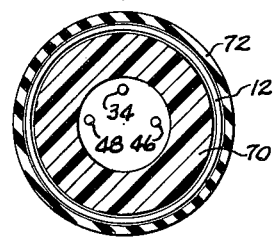
Figures 5, 7:
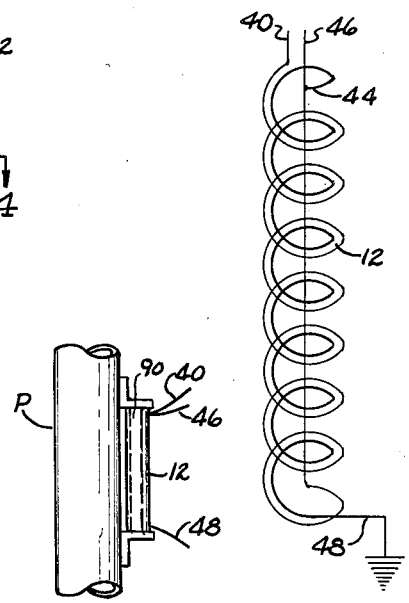
Figure 6:
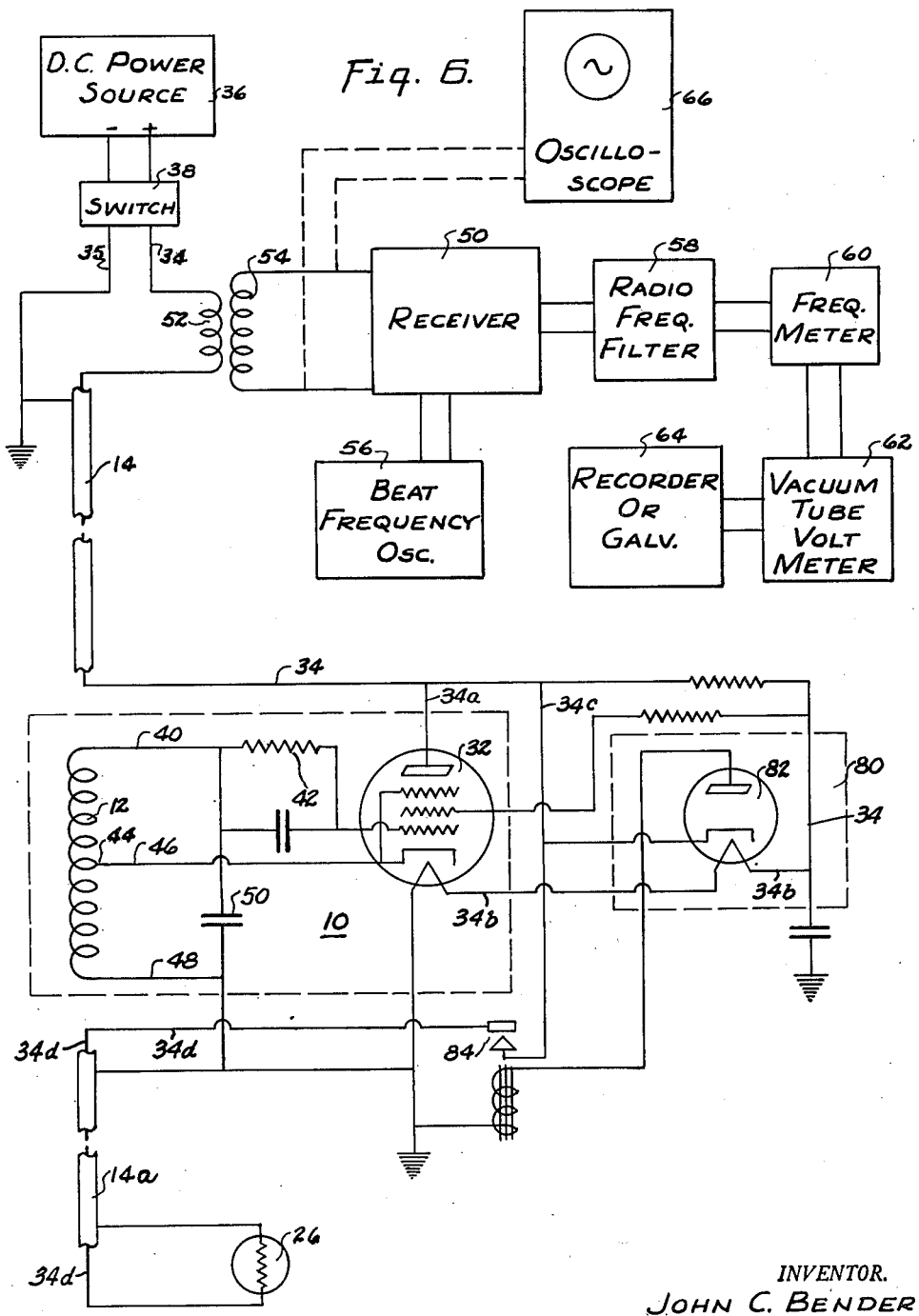

The accomplishments of the above and other objects will be apparent to those skilled in the art from the following description when taken in connection with the accompanying drawing, wherein like reference characters refer to like parts throughout the several views, and it is to be expressly understood that the drawing is not a definition of the invention, but merely illustrates a preferred form of a device by means of which the principles of the invention may be effectuated and where Fig. 1 is an elevation illustrating the invention in combination with means to disconnect the free pipe, Fig. 2 is a typical graph of a record illustrating a point of fixture of pipe in a well bore, Fig. 3 is an elevation in section illustrating a preferred coil utilized in my tester, Fig. 4 is a cross-section taken along the line 4—4 of Fig. 3, Fig. 5 is a diagrammatic illustration of a preferred bifilar winding of a coil, Fig. 6 is a schematic circuit diagram illustrating a preferred electrical arrangement for the purposes of my invention, Fig. 7 illustrates an embodiment of my invention utilized to determine load, stress or strain in specimens or objects, and Figure 8, is an elevation similar to that of Figure 1, illustrating the invention in combination with alternate means to disconnect the free pipe, and Figures 9 and 10 are sectional elevational views of frangible containers utilized according to the invention.

Referring to the drawings my invention includes an oscillator 10 and a coil 12 secured to the cable 14 by means of the upper conventional cable connection 16. The coil 12 is threadedly secured at its lower end to the conventional cable connection 18 from which the cable 14 extends a considerable length being connected to the upper conventional cable connection 20 from which the cable 14 continues, having the nose piece or weight member 22 secured to its lower end. Explosive material, such as "Prima Cord" 24, is secured to the lower portion of the device and the former has the detonating cap 26 secured to its upper end. The oscillator 10 and coil 12 are secured together by the coupling 28 which may be any preferred or conventional coupling known to the art to provide an electrical connection between the oscillator and the coil.

The cable 14 contains electrical conductors 34 and 35 and such cable may be any conventional type known to the art. The composite device is lowered into the well bore 30 by means of the cable extending from the conventional reel and measuring equipment disposed on the truck, all generally indicated by the numeral 32, the cable 14 being threaded through the derrick 94. The cable and means for lowering the device into the well are well known to the art and no detailed description thereof is considered necessary.

Referring to Fig. 6 the oscillator illustrated includes a pentode 32, the plate of which is supplied positive potential by means of the electrical conductors 34 and 34a of the cable 14 from a direct current source of power 36. A reversing switch 38 is provided for a reason which will be apparent later. The coil 12 is connected by the conductor 40 through the grid resistor 42 to the grid of the pentode 32 and a center tap 44 of the coil 12 is provided whereby the coil is tapped to the cathode of the pentode by means of the conductor 46. The coil 12 is connected by the conductor 48 to ground and a condenser 50 is provided in parallel with the coil 12. In the arrangement illustrated the electron-coupled oscillator will generate radio frequency current so long as positive potential is supplied to the plate of the pentode 32. While any desired frequency may be utilized, I have found that a frequency between 20 and 50 kilocycles is satisfactory for my purpose. Thus the tank circuit provides a radiation from the coil or probe 12 which inductively couples the casing or pipe P to the tank circuit of the oscillator by the radiated waves and any changes in the inductive load reflected into the tank circuit will be indicated on the oscilloscope 66 or the recorder 64. This circuit is inductively coupled to the radio receiver 50 through the line 14 to the primary 52 and secondary 54. The radio receiver 50 is located on the surface and is of the conventional tuned radio frequency type to which is connected a variable frequency oscillator 56 which is adapted to produce a beat frequency with the incoming signal from the tank circuit of oscillator 10. I have found that a beat frequency of from 100 to 1000 cycles off the zero beat, that is, the frequency of the oscillator in the hole, is satisfactory for my purpose.

The radio frequencies are filtered by the conventional filter 58, the beat frequency being connected to indicating or measuring means, such as the frequency meter 60, the vacuum tube volt meter 62 and the recorder or galvanometer 64. These elements are all conventional, are in widespread use and may be purchased commercially and no description thereof is deemed necessary. If desired, a conventional cathode ray oscilliscope 66 may be utilized in place of the arrangement described, and the conventional oscilliscope includes a beat frequency oscillator, is well known and no detailed description thereof is deemed necessary.

Referring to Figs. 3 to 5 inclusive, the coil 12 is wound about the tubular Bakelite member 70, such Bakelite member being recessed on its outer portion, and a rubber or suitable sheath 72 is secured about the coil 12 to protect the coil from fluid in the bore. The Bakelite member 70 is threadedly secured to the coupling 28 which secures the coil and oscillator together. Fig. 5 illustrates a bifilar method of winding the coil 12 and the coil is in all respects similar to that described in connection with Fig. 6.

Referring again to Fig. 6 I have provided a rectifier 80 of the vacuum tube type in which the cathode of the vacuum tube 82 is connected to the positive source of power by the electrical conductors 34 and 34b. Thus when a positive potential is being supplied to the cathode of the vacuum tube 82 by means of the electrical conductors 34 and 34b no current will pass through the vacuum tube rectifier and, accordingly, the relay 84 will remain open. Upon reversing the polarity by means of the reversing switch 38 the cathode of the vacuum tube 82 will be supplied negative potential by conductors 34 and 34b and current will be supplied to and will energize the relay 84 thereby closing the circuit and closing the same, thereby supplying potential to the detonator 26 by means of the conductor 34d, and thereby detonating the explosive, here indicated as prima cord 24. Thus, it is not possible to set off or detonate the explosive unless the reversing switch 38 is reversed to energize the relay 84 thereby closing the same and thereby detonating or firing the explosive, herein indicated as "Prima Cord" 24.

If it is desired to determine the point of fixation S of stuck pipe in a well bore and to recover the free pipe above the point of fixation S my method and apparatus may be used as follows. The device may be assembled as illustrated in Fig. 1 and lowered by means of the cable 14 threaded through the derrick 94 from the reel on the truck, generally indicated as 32. Torque may be applied to the pipe or casing P, and torque or tension or both may be maintained constantly or preferably applied intermittently. While testing the pipe and in order not to untimely uncouple lengths thereof, the torque is preferably applied in a direction to tighten the threaded connections, but such may be applied in a direction tending to unthread the couplings. Conventional measuring equipment, not shown, is utilized in connection with the reel, and as the coil unit 12 passes down through the pipe and torque, tension or both is maintained or intermittently applied the conventional chart recording mechanism 64 will indicate changes in the reflected load of the pipe inductively coupled to the coil passing therethrough. A typical graph is shown in Fig. 2. The points indicated by the reference letter T represent tool joints through which the coil is passing and the flattened or horizontal projection of the curve indicated by the reference letter S indicates the top of the stuck portion of the pipe P.

The method of operation includes setting up an alternating or oscillating current in the coil unit 12 and as successive portions of the pipe P come into proximate and spaced relationship therewith such successive portions become inductively coupled with and a part of the testing circuit. Inasmuch as a given area of pipe becomes a portion of the oscillatory circuit due to eddy currents being induced into the pipe and reflected back into the tank circuit, the variation of the reflected load of the pipe will produce a change in inductance of the tank circuit thereby changing the fundamental frequency of the oscillator and thereby indicating the stuck portion due to the change in the reflected load of the free pipe immediately above the point of fixation S and the stuck pipe immediately therebelow. Inasmuch as the pipe above the stuck portion is under tensile stress or torque or both it seems manifest that there is a change in the reflected load of the pipe at the point of fixation inasmuch as the pipe at that point and therebelow will not be under such tensile or torque stresses.

After locating the upper portion S of the stuck pipe P, torque may be applied tending to unthread the coupling and the device will give an indication whether such torque extends down to the stuck portion S. If not, the pipe may be worked up and down while applying such torque. When torque has been extended to the top of the stuck portion the device may be raised until the "Prima Cord" 24 is preferably centered on the coupling desired to be broken. This is usually one or more joints above the stuck point S. The pipe may then be lifted by conventional means to neutralize the weight of the pipe at the desired coupling. The impacting means, in this case the "Prima Cord" 24, is detonated by reversing the polarity of the conductors 34 and 35, thereby energizing and closing the relay 84. This allows current to flow through the detonating cap 26 and initiate the explosion of the impacting means. This explosion sets up shock waves producing a vibratory or hammering effect at the coupling, which combined with the applied torque, will tend to unthread the coupling at this point. If the torque in the string of pipe is insufficient to completely effect the disconnection, the rotary table, not shown, may be rotated and an additional amount of torque applied until the disconnection is complete. If desired the oscillator and coil may be lowered and an indication in the testing circuit will occur if the joint is free. Thus complete control and knowledge of the operations are maintained and available at all times. Thereafter the device and the pipe may be removed in a conventional manner well known to the art. Of course, if desired, the impacting device and oscillator and coil may be run separately, but manifestly many of the above advantages will not be present.

From the above description it is manifest that my method and apparatus is particularly adapted to locate the point of fixation of stuck pipe in a well bore and to free the same. In locating the stuck pipe, however, it is not necessary to put a tensile or torque force on the pipe as the weight of the free pipe above the stuck portion will apply a compressive force or stress in the pipe which will not be present in that portion of the pipe which is tightly lodged against the sides of the well bore. It has been found that a much sharper curve obtains when the permeability is changed due to compressive forces rather than tensile or torque forces. It seems apparent that in locating the position of fixture of stuck pipe in the well bore that either torque or tensile forces or any combination thereof may be utilized. Moreover, while my invention and method has been described particularly with respect to a method of removing pipe from wells in which an explosive charge is discharged substantially proximate the connection to be unthreaded preferably while taking tension and torque or only torque tending to unthread the connection on the pipe, as broadly taught in Kinley, Patent No. 2,305,261, issued December 15, 1942, it is manifest that other means of providing the necessary impact to the desired coupling to be unthreaded may be utilized, such as the hydraulic surge method taught by Mason in Patent No. 2,361,558, issued October 31, 1944, or by using what is known as an "explosion type" bailer such as described in Gates, Patent No. 2,139,076, issued December 6, 1938. It is believed to be preferable, however, to utilize the 'Prima Cord" method of providing the necessary impact to the connection to be unthreaded as above described.

The hydraulic surge method as disclosed by Mason in Patent No. 2,361,558 is diagrammatically illustrated in Figure 8, which is in all respects the same as Figure 1 except that the portion below the testing element is illustrated, for the purpose of description, the strain gage by which the stuck pipe is located is omitted, and the elements are illustrated as connected to the cable 14b, which is the equivalent of cable 14a below the strain gage illustrated in Figure 1.

Referring now to Figures 8–10, and, as best seen in Figures 9 and 10 a frangible container 100 is utilized which is capable of withstanding extremely high pressures such as those encountered at considerable depths in earth bores having a column of liquid therein. The container 100 comprises a cylindrical portion 102 which is closed at its ends by the semispherical end portions 103 and 104. This container is frangible and is of such material and wall thickness as to withstand pressures of several thousand pounds per square inch since pressures of such magnitude are encountered in many wells which are drilled in accordance with well drilling practice.

A "Pyrex" glass container having walls $\frac{3}{16}$ of an inch in thickness serves very satisfactorily, although it is understood that such containers are not confined to the specific material and dimensions mentioned since it is apparent that other glasses or other frangible material such as modern frangible synthetics may be utilized and with such wall thicknesses as to withstand the pressure to which the container is subjected.

The container 100 may be of any suitable length. However, in view of the fact that the container is frangible and is intended that it be lowered within a tubular bore which may variously incline at different points throughout the length of the bore, it is preferable that the container shall not be excessive in length, a length of 48 inches having been found entirely satisfactory. If it is desired that the displaced volume shall be greater than that of a single container of relatively limited length, a plurality of such containers may be used, as shown in Figure 8, without loss in effectiveness.

The container illustrated in Figure 10 differs from that in Figure 9 in that the upper end 103 is provided with a tapered opening 105 of which the walls have a ground fit with the stopper 106 which may be of the same or different material than that of the remainder of the container 100a. By using a ground fit between the stopper 6 and the container 100a there is provided a container which may be opened or closed if desired. At the same time such container is free from leakage that would reduce or destroy the effectiveness thereof.

In using the containers 100 or 100a, the containers are filled with a gaseous fluid, generally air, which may be at or somewhat above atmospheric pressure. Preferably, however, the pressure within the containers is subatmospheric and the closer an absolute vacuum is approached the more effective will the container be in performing its desired operation. It is to be understood, however, that so long as there is a differential pressure between the exterior and the interior of the container, the surge action of the well fluid within the well bore will be produced.

The containers 100 tend to flow within the liquid within the well bore and accordingly are lowered to operating condition by means of a combined sinker bar and jar 106 which is lowered on the cable 14b which extends from the strain gage, as previously described. The lower end 107 of the bar is provided with a head 108 which engages the uppermost of the containers 100. Thus, as the unit is lowered within the well bore the containers 100 are likewise lowered into the desired position.

The upper end of the bar 106 is made in the form of a link 109 which has a loose connection with a similar link 110 which has a cable connection 111 at its upper end by which it is connected to the cable 14b.

When using this form of the invention, after the point of fixation of the stuck pipe has been ascertained by the strain gage, as previously described, the entire device is lowered until the containers 100 are approximate the coupling T to be disconnected. A torque and/or lifting force is exerted on the connection T tending to unthread the same and, at the same time, an impact is imparted thereto by a quick movement or jerk applied to the cable 14 at the top of the well. The impact thus imparted to the container in addition to the liquid pressure thereon initiates fracture thereof and such fracture is followed by the shattering of the container and such shattering progresses rapidly under the continued pressure. At the same time the liquid column in the well is accelerated downwardly under its own weight.

The nethermost container or containers may have been fractured simultaneously with the fracture of the upper container. In any event all of the containers are fractured during the rapid occurrence of the succession of events as the liquid column accelerates downwardly to fill the void created by the fractured containers. Such void is quickly filled with the moving liquid but in the meantime the static head of the liquid column is converted into a velocity head.

The kinetic energy of the column of liquid must be dissipated in order to again bring about static conditions in the well. Such dissipation of energy occurs during the ensuing violent surge during which the liquid is forced against the coupling T thereby impacting the same and initiating unthreading thereof, as mentioned previously.

Other apparatus which may be used in the method are illustrated and described in the Mason Patent No. 2,361,558. It should be noted, however, that detonating the "Prima Cord" 24 causes a hydraulic surge of liquid in the casing which produces the impact or hammering effect on the coupling T to initiate unthreading thereof upon the application of torque or torque and lifting forces.

It is to be understood that any type of conventional L. C. oscillators may be employed and that any type of conventional coil may be utilized to inductively couple the pipe to the testing circuit, and any of the coils illustrated in the patent to H. C. Knerr et al., No. 2,124,579 may be utilized, as well as others known to the art. Moreover, if desired the prima cord may be fired by means of an alternating current. In this instance the switch 38 may be provided with contacts to an A. C. power source and when the switch is manipulated so that A. C. current flows in the conductors 34 and 35, alternating current will be applied to the plate of the tube and due to the reactance of conductor 35, current will be applied to and energize the relay 84. In this instance it is preferable for the relay 84 to have a shaded pole to reduce chattering and thereby provide a good contact on closing. Current then passes through the fuse or detonator 26 to ground and thereby detonates the explosive. In all other respects the circuit may be the same as illustrated and described.

While the above description of my invention has been directed toward a particular use to which it is especially adapted it is to be understood that my invention includes the omission of the impacting device altogether and in such cases and uses my device may be utilized for determining various conditions of pipe in a bore hole or various conditions of materials to which it may be secured. For example, my oscillator and coil may be utilized in finding splits, holes, threads in casing or pipe inasmuch as there will be a change in the reflected load at that point which will be indicated by the testing circuit. Similarly, it is possible to locate accurately the position of gun perforation holes to determine whether or not the perforating has been performed at the desired location. As indicated by Fig. 2, the location of tool joints may be indicated by reason of the change in the reflected load in the testing circuit and the location of the top of a liner, screen or a change in the size of the pipe may be readily indicated. It is also possible to locate the top of a cement plug in casing and, in the event gas is escaping about the pipe in a well bore, such escapement of gas will cause a temperature change in the pipe thereby changing the reflected load of the pipe whereby the position or location of such escaping gas or fluid may be readily indicated by the testing circuit. Moreover, various valves, such as gas lift valves, and metal adjacent the pipe, such as whipstocks and the like, may be readily indicated and their location determined by virtue of the change in reflected load in the circuit.

A further example of a particular use to which my invention may be adapted is illustrated in Fig. 7 in which the embodiment is essentially a strain gage. The coil 12 is wound about a suitable core 90 formed of material of the desired permeability, such as iron or steel and the like. The core or bobbin may be welded or bolted or secured in any conventional manner to the structure in which a load or stress-strain measurement is to be made. Such a structure may be the derrick 94, a bridge or any structure or specimen P in which stress or strain or load measurements are desirable. It should be noted that it is not necessary to have the strain gage connected to the indicating circuit inasmuch as it is a radiating medium. This is particularly advantageous in use with swinging bridges and the like where it may be desirable to utilize a plurality of strain gages.

The basic concept of this embodiment of my invention is the provision of a permeable bobbin which is secured to the surface of the specimen in such a way that the bobbin experiences the same load, stress or strain as the specimen and, inasmuch as the bobbin is of the desired permeability, minute load, stress or strain in the specimen will be readily indicated in the testing circuit due to the change in permeability of the bobbin 90 thereby varying the reflected load into the tank circuit. Thus the load, stress or strain in the specimen per se is measured by means of the complementary load, strain or stress set up in the permeable bobbin 90 about which the coil 12 is wound. It is manifest that extremely accurate measurements of load and stress-strain in materials may be made by means of my invention. It is to be understood that the indicating circuit available for the measurements of the strain gage may vary widely, and such may operate on the principle of the Wheatstone bridge and galvanometer and the like or a circuit similar to that of Fig. 6 may be used.

In the following claims "anomalies" are defined as permeability change; physical change, such as splits, holes, perforations, threads, valves and metal such as whipstocks associated with the pipe, overshots, tool joints, screens and changes in the size of pipe and the like. It is to be further understood that any conventional oscillating generator and indicating means may be utilized; however, the arrangement illustrated is preferred. It is apparent that my invention is of wide scope and application and I intend to be limited only by the scope of the appended claims.

I claim:

1. A method of locating the point of fixation of stuck pipe in a well bore and thereafter disconnecting a threaded connection of free pipe therein comprising, lowering into the pipe a probe forming a part of a strain gage testing circuit, said probe and strain gage testing circuit indicating stress and strain of said pipe, simultaneously lowering an impacting means in the pipe, simultaneously moving said probe and impacting means in said pipe while the pipe is maintained under strain whereby the location of the point of fixation of said stuck pipe is indicated by said strain gage testing circuit, and thereafter impacting said threaded connection with said impact means while applying a torque force to the pipe tending to initiate unthreading thereof.

2. The method of claim 1 where the impacting is by discharging an explosive charge at a point proximate the threaded connection and interiorly thereof to initiate unthreading of the threaded connection.

3. The method of claim 1 where such impacting is by producing a sharp surge of liquid at a point proximate the threaded connection and interiorly thereof to initiate unthreading of the threaded connection.

4. A method of locating the point of fixation of stuck pipe in a well bore and disconnecting a threaded connection of free pipe therein comprising, simultaneously lowering into the pipe an impacting means and a probe forming a part of a strain gage testing circuit, said probe and strain gage testing circuit indicating stress and strain in said pipe, applying strain to the upper part of the pipe and simultaneously moving the probe and impacting means in the pipe while the pipe is maintained under said strain whereby the location of the point of fixation of the stuck pipe is indicated by the strain gage testing circuit, and impacting the threaded connection with the impacting means while applying a lifting force to the pipe to relieve the stress applied to the connection by the weight of the superposed string of pipe and while applying a torque force tending to initiate unthreading of the threaded connection.

5. The method of claim 4 where the impacting is by discharging an explosive charge at a point proximate the threaded connection and interiorly thereof to initiate unthreading of the threaded connection.

6. The method of claim 4 where such impacting is by producing a sharp surge of liquid at a point proximate the threaded connection and interiorly thereof to initiate unthreading of the threaded connection.

7. A method of locating the point of fixation of struck pipe in a well bore and thereafter disconnecting a threaded connection of free pipe therein comprising, applying a lifting force to the pipe to relieve the stress applied to the connection by the weight of the superposed string of pipe, applying a torque force to the upper part of the string of pipe, maintaining a test circuit, lowering into the pipe an impacting means and a probe of the test circuit, said impacting means and probe being mounted on a cable, moving said impacting means and probe in the pipe while applying said lifting and torque forces, instrumentally observing at the surface fluctuations in the current in the probe produced by leakage of lines of force in, to or from the pipe whereby the location of the point of fixation of the stuck pipe is determined, moving said impacting means adjacent said threaded connection and impacting said threaded connection with said impacting means while maintaining such lifting force and while applying a torque force tending to initiate unthreading of the threaded connection.

8. A method of locating the point of fixation of stuck pipe in a well bore and thereafter disconnecting a threaded connection of free pipe therein comprising, applying a lifting force to the pipe to relieve the stress applied to the connection by the weight of the superposed string of pipe, applying a torque force to the upper part of the string of pipe, lowering into the pipe an impacting means and a test coil mounted on a cable, moving said test coil and impacting means in said pipe thereby inductively coupling successive small portions of such pipe with an oscillatory circuit, instrumentally observing at the surface fluctuations in the current in the test coil produced by leakage of lines of force in, to and from said stuck pipe induced by the applied lifting and torque forces, thereafter moving said impacting means adjacent said threaded connection and impacting said threaded connection with said impacting means while maintaining such lifting force and a torque force tending to initiate unthreading thereof.

9. A method of locating the point of fixation of stuck pipe in a well bore and thereafter disconnecting a threaded connection of free pipe therein comprising, applying a strain to the pipe, lowering into the pipe an impacting means and a test coil, said test coil forming part of a test circuit, simultaneously moving said test coil and impacting means in said pipe while maintaining said pipe under said strain, instrumentally observing at the surface fluctuations in the current in the test circuit produced by leakage of lines of force in, to or from said pipe induced by said strain, and thereafter impacting said threaded connection with said impacting means while maintaining a torque force on said pipe tending to initiate unthreading of said threaded connection.

10. A method of locating the point of fixation of stuck pipe in a well bore and thereafter disconnecting a threaded connection of free pipe therein comprising, applying a torque force to the pipe in a direction opposite to that tending to initiate unthreading of said threaded connection, simultaneously lowering into the pipe an impacting means and a probe forming part of a strain gage testing circuit, said probe and strain gage testing circuit indicating stress and strain in the pipe, simultaneously moving said impacting means and probe in said pipe while maintaining said torque force on said pipe whereby that portion of the pipe under said torque strain and that portion substantially free of said torque strain are indicated by the strain gage testing circuit thereby indicating the point of fixation of the stuck pipe in the well bore, moving the impacting means proximate the threaded connection, applying a torque force tending to initiate unthreading of the threaded connection, and impacting said threaded connection with said impacting means while maintaining said torque force tending to initiate unthreading of the threaded connection.

11. A method of locating the point of fixation of stuck pipe in a well bore and thereafter disconnecting a threaded connection of free pipe therein comprising, lowering into the pipe an impacting means and a probe forming part of a strain gage testing circuit, said impacting means and probe being mounted on a support, said probe and strain gage testing circuit indicating stress and strain in the pipe, moving said support and thereby said probe and said impacting means in said pipe while applying strain to the pipe so that portion of said pipe under said strain and that portion of the pipe substantially free of said strain is indicated by said strain gage testing circuit thereby indicating the point of fixation of said pipe, applying a torque force to the upper portion of the pipe tending to initiate unthreading of the threaded connection, and impacting said threaded connection with said impacting means while maintaining said torque force tending to initiate unthreading of the threaded connection.

12. Apparatus for determining the point of fixation of stuck pipe in a well bore and disconnecting a threaded connection of free pipe therein, all in one trip of the apparatus in the well bore, comprising, a strain gage testing circuit, a support for lowering and moving in the pipe, a probe forming part of said strain gage testing circuit connected to and supported by said support, said probe and strain gage testing circuit indicating stress and strain in the pipe whereby upon applying strain to the pipe an indication is given by said strain gage testing circuit upon movement of said strain gage testing element from portions of said pipe under said strain to portions of said pipe substantially free of said strain thereby causing variations in the current in the strain gage testing circuit, means at the surface in the strain gage testing circuit for observing said variations in the current, and impacting means secured to said support to impact such threaded connection interiorly thereof during application of torque to the pipe above the connection tending to unthread the connection and thereby initiate unthreading thereof.

13. The apparatus of claim 12 where the means to impact the threaded connection comprises explosive means adapted to be discharged interiorly of and proximate the connection.

14. The apparatus of claim 12 where the means to impact the threaded connection comprises means to produce a hydraulic surge of well fluid interiorly of and proximate the connection.

15. Apparatus for ascertaining the point of fixation of stuck pipe in a well bore and disconnecting a threaded connection of free pipe thereof comprising, a test circuit, a test coil connected to said test circuit to inductively couple successive small portions of such pipe thereto as the coil is moved in the pipe, a support for lowering into the pipe, said test coil being connected to said support, means at the surface associated with the test circuit for observing fluctuations in the current in the test coil produced by leakage of lines of force in, to or from the pipe whereby changes in the reflected load of such pipe induced by strain are indicated thereby locating the point of fixation, and impacting means secured to the support and adapted to be lowered into the pipe on the support with the test coil to impact said threaded connection interiorly thereof during application of torque to the string of pipe above the connection tending to unthread the connection and thereby initiate unthreading thereof.

16. Apparatus for determining the point of fixation of stuck pipe in a well bore and disconnecting a threaded connection of free pipe thereof comprising, an oscillatory circuit, probe means connected to such circuit to inductively couple successive portions of such pipe to such circuit as the probe means is lowered therein, support means for lowering the probe means in the pipe and suspending the latter, indicating means at the surface associated with such circuit whereby changes in the reflected load of such pipe induced by strain are indicated thereby locating the point of fixation, and impacting means suspended from said support and adapted to be lowered into the pipe with the probe means to impact such threaded connection interiorly thereof during application of torque to the string of pipe above such connection tending to unthread such connection and thereby initiate unthreading thereof.

17. The apparatus of claim 16 where the impacting means comprises explosive means adapted to be discharged interiorly of and proximate such connection.

18. The apparatus of claim 16 where the impacting means comprises means to produce a hydraulic surge of well fluid interiorly of and proximate such connection.

19. Apparatus for determining the point of fixation of stuck pipe in a well bore and disconnecting a threaded connection of free pipe thereof comprising, a support adapted to be lowered into the pipe, a test circuit, a test coil mounted on the support and connected to the test circuit, said test coil inductively coupling successive small portion of such pipe to said test circuit on movement of said test coil therein, indicating means at the surface associated with the test circuit whereby changes in the reflected load of such pipe are indicated at the surface while the pipe is maintained under strain thereby locating the point of fixation of said pipe, an explosive impacting means secured to the support and adapted to be lowered into the pipe with said test coil, a detonator connected to said explosive impacting means, and a rectifier connected to said detonator and arranged in said testing circuit so that reversal of current flowing in said testing circuit energizes the detonator and thereby detonates the explosive impacting means thereby impacting said threaded connection interiorly thereof whereby application of torque to the string of pipe above such connection and the impact initiates unthreading thereof.

20. A method of locating the point of fixation of stuck pipe in a well bore and thereafter disconnecting a threaded connection of free pipe therein comprising, lowering into the pipe an impacting means and an oscillator including a test coil, said oscillator and test coil forming part of a testing circuit, said impacting means, oscillator and test coil being mounted on a support, moving said support and thereby said impacting means, oscillator and test coil in said pipe while strain is applied to said pipe thereby inductively coupling successive small portions of said pipe with the testing circuit, instrumentally observing at the surface by an instrument forming a part of the testing circuit fluctuations in the current in the test coil produced by leakage of lines of force in, to or from said pipe induced by said strain thereby determining the point of fixation of said stuck pipe, thereafter moving said support and thereby moving said impacting means adjacent said threaded connection and impacting said threaded connection with said impacting means while applying a torque force tending to initiate unthreading of the threaded connection.

References Cited in the file of this patent

UNITED STATES PATENTS

| Number | Name | Date |
|---|---|---|
| 2,045,474 | Kemler | June 23, 1936 |
| 2,056,996 | Zuschlag | Oct. 13, 1936 |
| 2,077,161 | Zuschlag | Apr. 13, 1937 |
| 2,139,076 | Gates | Dec. 6, 1938 |
| 2,172,481 | Osmun | Sept. 12, 1939 |
| 2,194,229 | Johnston et al. | Mar. 19, 1940 |
| 2,200,505 | Kerr | May 14, 1940 |
| 2,266,623 | Gurasich | Dec. 16, 1941 |
| 2,275,532 | Lamberger et al. | Mar. 10, 1942 |
| 2,300,384 | Johnston | Oct. 27, 1942 |
| 2,305,261 | Kinley | Dec. 15, 1942 |
| 2,308,159 | Drummond et al. | Jan. 12, 1943 |
| 2,326,344 | Elmendorf et al. | Aug. 10, 1943 |
| 2,337,269 | Piety | Dec. 21, 1943 |
| 2,353,211 | Zuschlag | July 11, 1944 |
| 2,361,558 | Mason | Oct. 31, 1944 |
| 2,435,985 | Stewart et al. | Feb. 17, 1948 |
| 2,501,598 | Eltenton et al. | Mar. 21, 1950 |
| 2,524,031 | Arps | Oct. 3, 1950 |
| 2,530,308 | Martin | Nov. 14, 1950 |
| 2,530,309 | Martin | Nov. 14, 1950 |
| 2,544,569 | Silverman | Mar. 6, 1951 |